United States Patent [19]

Oughton

[11] 4,208,259

[45] Jun. 17, 1980

[54] TREATMENT OF COMMINUTED OATS UNDER THE INFLUENCE OF AN ELECTRIC FIELD

[75] Inventor: Richard W. Oughton, Odessa, Canada

[73] Assignee: Du Pont of Canada, Limited, Montreal, Canada

[21] Appl. No.: 35,645

[22] Filed: May 3, 1979

[30] Foreign Application Priority Data

May 9, 1978 [GB] United Kingdom ............... 18542/78

[51] Int. Cl.$^2$ ............................ B03C 5/00; A23J 1/12
[52] U.S. Cl. ................................. 204/180 R; 204/186; 260/112 G; 260/112 R; 260/123.5; 426/436; 426/463; 426/656
[58] Field of Search ................... 204/180 R, 186, 188, 204/299 R, 300 R; 260/112 G, 112 R, 123.5; 426/436, 463, 656

[56] References Cited

U.S. PATENT DOCUMENTS

| | | | |
|---|---|---|---|
| 1,229,203 | 6/1917 | Schwerin | 204/180 R |
| 2,485,335 | 10/1949 | Tyson | 204/180 R |
| 2,900,320 | 8/1959 | Metcalfe et al. | 204/180 R X |
| 2,944,952 | 7/1960 | McMinn, Jr. | 204/180 R |
| 3,556,969 | 1/1971 | Mizuguchi et al. | 204/180 R X |
| 3,642,605 | 2/1972 | Chenel et al. | 204/300 R |
| 3,828,017 | 8/1974 | Finley et al. | 260/123.5 X |
| 3,869,438 | 3/1975 | Finley et al. | 260/123.5 |
| 4,053,492 | 10/1977 | Boocock et al. | 260/123.5 X |
| 4,064,119 | 12/1977 | Kruseman | 260/123.5 |
| 4,089,848 | 5/1978 | Bell et al. | 426/656 X |

*Primary Examiner*—Arthur C. Prescott

[57] ABSTRACT

A process for the separation of a comminuted oat fraction from an admixture thereof with solvent is disclosed. An admixture of the fraction and the solvent is subjected to a high voltage electric field between an anode and a cathode, thereby depositing at least part of the comminuted oat fraction on at least the anode. The solvent is either an aliphatic hydrocarbon containing from 5 to 8 carbon atoms or a normally liquid chlorofluorocarbon containing 1 or 2 carbon atoms. In a preferred embodiment the fraction is a fraction of high protein content and the deposit is only on the anode. In another embodiment the fraction is in the form of a dispersion, e.g. fines, in the solvent.

15 Claims, No Drawings

TREATMENT OF COMMINUTED OATS UNDER THE INFLUENCE OF AN ELECTRIC FIELD

The present invention relates to a process for the treatment of comminuted oats and especially to a process for the treatment of comminuted oats under the influence of an electric field. In particular the invention relates to the treatment of admixtures of comminuted oats and a solvent, especially a hydrocarbon solvent, for oil in the oats, such admixtures being treated under the influence of an electric field.

As used herein the expression "groats" refers to the kernel of the oat, the expression "flour" refers to the endosperm of the oat and the expression "bran" refers to the bran of the oat; such bran may have endosperm attached thereto. The expression "gum" refers in particular to water-soluble gum.

Oats are a potential source of a wide variety of useful products. Examples of such products are flour, starch, protein isolate and concentrate, protein-enriched flour, bran, gum and oil. Traditional techniques used in the cereal grain processing industry are frequently difficult to use with oats. For example, milling processes are difficult to use with oats because of process problems relating to the presence of oil in the oats. Moreover, unless the oats are de-oiled prior to milling, such milling processes would result in the formation of flour and bran fractions containing oil which may result in the development of rancidity on storage of the flour and bran.

Gum, together with some protein and starch, may be removed in part by treatment of oats with water, the resultant dilute aqueous solution of gum then requiring treatment prior to disposal or for recovery of the gum. Protein may be extracted from comminuted oats with aqueous solutions, especially alkaline solutions. However, gum present in the oats may also be extracted into solution and the resultant solutions may be viscous and cause process problems, especially in the separation of solids from the aqueous solutions.

A process for the separation of a flour fraction, a bran fraction and oil from comminuted oats in which gum does not cause significant process problems and in which the flour is essentially free of gum is disclosed in United States Patent Application Ser. No. 695,206 of R. W. Oughton, filed June 11, 1976, now abandoned. A process for the separation of comminuted oats, especially flour fractions, into fractions differing in composition in which the separation occurs under the influence of centrifugal force is disclosed in United States Patent Application Ser. No. 747,734 of R. W. Oughton filed Dec. 6, 1976.

Techniques for the separation of solid particles from an organic liquid e.g. for the separation of solid particles from a dispersion thereof in organic solvent, are known. For example in U.S. Pat. No. 3,304,251, which issued Feb. 14, 1967, J. Walker et al describe a process for the separation of wax from a dispersion thereof in oil in which the separation involves the use of a nonuniform electric field. The separation is referred to in the patent as dielectrophoresis. It is stated that in order to obtain the separation of the solid particles of wax, the solid particles must have a dielectric constant higher than that of the continuous phase of the dispersion.

Processes for removing electrically conductive materials from hot liquid hydrocarbon feed stock are disclosed in U.S. Pat. Nos. 3,928,158 of G. R. Fritsche et al, which issued Dec. 23, 1975; 4,009,089 of J. H. Crissman et al, which issued Feb. 22, 1977; and 4,022,675 of J. D. Chachere, which issued May 10, 1977. Such processes for removing electrically conductive materials involve passing the feed stock through interstitial spaces defined by non-conducting spherical particles, for example, of glass or ceramics. The spherical particles are located between electrodes across which an electric field is applied. The electrically conductive materials in the feed stock become deposited on the spherical particles from which they may be removed by back-flushing.

The separation of comminuted oats, or fractions thereof, from an admixture of such oats or fractions and a hydrocarbon solvent may be accomplished by, for example, centrifuging the admixture. However such separation techniques are capable of improvement especially with regard to separation of products in a form that is essentially free from contamination with, for example, any oat oil in the solvent and/or so that the remaining hydrocarbon solvent miscella has a low level of fines. The presence of fines in miscella has traditionally been a problem in the processing of oil seeds.

It has now been found that comminuted oats, and especially fractions thereof, may be separated from an admixture of such oats and a hydrocarbon or fluorocarbon solvent under the influence of a d.c. electric field and that such separation techniques are capable of providing comminuted oats essentially free from contamination with oat oil and/or with low levels of fines.

Accordingly the present invention provides a process for the separation of a comminuted oat fraction from an admixing thereof with a hydrocarbon or chlorofluorocarbon solvent, said solvent being capable of extracting oat oil from said oats, comprising the steps of:

(a) subjecting the admixture to the influence of a high voltage d.c. electric field, said admixture being in the form of a slurry and said electric field being formed between an anode and a cathode, and thereby depositing at least part of the comminuted oat fraction on at least the anode, and (b) separating the part so deposited from said admixture.

In a preferred embodiment of the process of the present invention the comminuted oat fraction is a fraction of high protein content, said fraction only being deposited on the anode.

In another embodiment, the admixture of the comminuted oat fraction and the solvent is a dispersion of said fraction in the solvent.

In a further embodiment, parts of the comminuted oat fraction are deposited on each electrode, the composition of the part deposited on the anode differing in composition from the part deposited on the cathode.

In yet another embodiment, step (b) is followed by step (c) in which the part so deposited is contacted with solvent essentially free of oat oil.

In the process of the present invention the comminuted oat fraction that is to be separated is in admixture with a solvent, especially a hydrocarbon solvent, for the oil in the oats. Such a solvent will facilitate extraction of oat oil from the comminuted oat fraction i.e. the de-oiling of the fraction. The solvent used must be acceptable for use with foodstuffs e.g. be non-toxic at the levels remaining in the products subsequently produced, not cause the formation of toxic materials in the products and not have a significant deleterious effect on the nutritional value of the product. The amount and type of solvent remaining in products offered for sale must be acceptable to the appropriate health authorities, as will be understood by those skilled in the art. Such solvents are best described as aliphatic hydrocarbons containing from 5 to 8 carbon atoms. Examples of solvents are pentane, hexane, heptane and cyclohexane, and mixtures thereof; as used herein the solvents hexane and heptane include those solvents referred to in the food industry as hexane and heptane. The preferred solvent is hexane. The present invention will generally be described hereinafter with reference to hexane as the solvent.

Although the process of the present invention is particularly described herein with reference to hydrocarbon solvents, especially hexane, the process may also be operated with normally liquid chlorofluorocarbon solvents containing 1 or 2 carbon atoms, for example, trifluorotrichloroethane which is available under the trade mark FREON 113. Such fluorocarbons must be liquid under the conditions at which the process is operated.

The comminuted oat fraction used in the process of the present invention is preferably derived from dehulled oats. Techniques for dehulling oats are known in the art. Dehulled oats are generally referred to herein as groats.

In embodiments of the present invention the admixture of comminuted oat fraction and hexane subjected to the influence of an electric field may be obtained from a variety of sources. For example the admixture may be formed from comminuted groats and hexane. In such admixtures the comminuted groats are groats that have been comminuted in order to facilitate extraction of oil. The required particle size of the comminuted groats will depend primarily on the requirements of other processes to which the comminuted groats are to be subjected and the requirements with respect to the de-oiling of the groats.

The admixture may also be an admixture of a comminuted oat fraction and hexane that has been obtained from a step of a process disclosed in that aforementioned United States patent application of R. W. Oughton. Such an admixture may be for example, an admixture of hexane and an oat fraction having a high protein content or an admixture in the form of a dispersion of particles of an oat fraction in hexane that remains after a slurry of a comminuted oat fraction and hexane has been centrifuged so as to separate the fraction from the hexane.

In the process of the present invention the admixture is usually in the form of a slurry when it is subjected to the influence of the electric field. In particular embodiments of the process the slurry is, in whole or in part, a dispersion of the comminuted oat fraction in hexane.

In the process of the present invention the oat fraction may become deposited on the anode or on both the anode and the cathode while under the influence of the electric field. When the electric field is discontinued the deposited comminuted oat fraction may or may not remain deposited on the electrode. There appear to be a number of important factors in the deposition of comminuted oat fraction, especially fractions of low protein content, on the electrode(s). One factor is the shape of the electrodes. If the electrode is plate-like and in a vertical position the influence of gravity alone will tend to make a deposit less likely to remain on the electrode. Similarly a deposit will have a relative tendency to remain on a sloping electrode, especially an electrode having a lip or the like at the lower edge thereof, or on a horizontal electrode.

Another factor is the nature of the comminuted oat fraction. If the comminuted oat fraction is for example groats or oat endosperm, oat fraction will tend to become deposited on both electrodes under the influence of the electric field. When the electric field is discontinued, the deposits tend to separate from the electrodes. In constrast comminuted oat fractions of high protein content tend to deposit on the anode only and remain on the anode when the influence of the electric field is discontinued. Other factors in the formation and properties of the deposit include the source and preparation of the comminuted oat fraction, particle size, voltage applied, agitation of the admixture of comminuted oat fraction and hydrocarbon solvent and nature of the electrodes. If the geometry of the anode is such that extremely high field intensities are produced, high protein material may deposit on and then be "thrown off" the anode.

As exemplified hereinafter the electric field to which the admixture is subjected according to the present invention is a high voltage d.c. electric field for example 1–20 kV/cm and especially 5–15 kV/cm. Higher or lower voltages may however be used. The d.c. electric field may be a steady or pulsating d.c. electric field.

In one embodiment of the present invention a comminuted oat fraction may be de-oiled. For example, an admixture of such a fraction and hexane, in which the fraction and/or the hexane contain oat oil, may be subjected to the influence of an electric field in a continuous or batch process. The preferred type of process may depend on the nature of the oat protein fraction. In a batch process all or part of the comminuted oat fraction could be deposited on the anode, or anode and cathode, and subsequently the remaining oil-containing miscella may be replaced with oil-free hexane to wash the deposit. The technique of replacing the miscella with oil-free hexane will depend to some extent on the nature of the deposit, as will be understood by those skilled in the art. In a continuous process the anode could be a moving electrode e.g. a rotating drum or a moving inclined belt, from which the deposit could be removed continuously. The deposit could be washed e.g. by spraying with oil-free hexane prior to being separated from the moving electrode. By judicious choice of, for example, technique, method and amount of washing and repetition of the deposition/washing procedure, the oil content of a comminuted oat fraction may be reduced by substantial amounts.

In another embodiment, oat fines may be removed from an admixture of hexane and a comminuted oat fraction remaining in the form of fines. For example, such an admixture could be in the form of a miscella obtained from a continuous centrifuge in which comminuted oat fraction is being separated from hexane. In a centrifugal separation process it is difficult to remove fines effectively from an admixture of comminuted oat fraction and hexane and, thus, the miscella discharged from the centrifuge usually contains fines. Such a miscella may be subjected to the influence of an electric field according to the present invention in order to remove part or even effectively all of the fines in the miscella. Apart from clarification, the separation of fines from the miscella may be beneficial in subsequent treatment of the miscella e.g. in the recovery of an oat oil in the miscella and/or in the recovery of hexane for further use.

In a further embodiment of the present invention, an oat fraction of high protein content may be recovered from an admixture of hexane and a comminuted oat fraction having a high protein content, e.g. at least 70% protein. Such an admixture may be obtained from a variety of sources, for example, using processes disclosed in the aforementioned applications of R. W. Oughton. Under the influence of the electric field on the admixture, the oat fraction of high protein content becomes deposited on the anode, the cathode normally being free of deposit. While the recovery of such an oat fraction may be operated as a batch or continuous process, the latter is preferred. Preferably, the anode is adapted for the continuous recovery of deposit e.g. it is a rotating drum or moving belt electrode. Recovery of the oat fraction, washed if necessary to remove adsorbed oat oil, so as to obtain an essentially oil-free fraction is possible.

In yet another embodiment, the process of the present invention may be used in the treatment of groats or flour, for example, to segregate flour into fractions differing in composition. Under the influence of an electric field flour becomes deposited from an admixture of flour and hexane onto both the anode and the cathode. As is exemplified hereinafter such deposits differ in protein content, especially if the admixture of groats or flour and hexane contain oat oil. If the comminuted oat fraction is groats, flour and bran will become deposited on the electrodes. However bran particles in groats tend to be larger in size than particles in flour and a partial separation of flour and bran may be effected as the larger particles may not become deposited on the electrodes. Depending on electrode design, in particular, the deposited flour and bran may not remain as the deposit if the electric field is discontinued. Such a characteristic may be used to advantage in separation or other treatment of groats or flour.

In the processes of the present invention the space between electrodes does not contain matter other than the admixture thereby permitting free flow of the admixture between the electrodes. As discussed hereinabove the admixture is usually in the form of a slurry. In specific embodiments, the slurry may be in the form of a dispersion. Extraneous matter between the electrodes may lead to plugging of the apparatus and hence process problems.

The various processes embodied by the present invention are useful in a variety of ways in the treatment of admixtures of comminuted oat fractions and hexane, as described herein.

The present invention is illustrated by the following examples.

EXAMPLE

Electrodes were fabricated from 35 mm photography slides with aluminum foil replacing the photographic film. Weighed electrodes were placed in a slide holder which was, in turn, placed in a large beaker equipped with a magnetic stirrer. A sample of an admixture of a comminuted oat fraction and hexane was added to the beaker so as to cover the slide frames. The admixture was maintained in the form of a slurry using the magnetic stirrer. A predetermined voltage (d.c.) was applied across the electrodes for a period of time. Subsequently the electrodes were removed, dried and the amount of oat fraction deposited on the electrodes was determined.

A series of runs were carried out with a new sample of admixture being used for each run.

The admixture of comminated oat fraction and hexane used in this example had been obtained by sieving an admixture of comminuted groats in hexane, feeding the admixture that passed through the sieve to a hydrocyclone and passing the overflow therefrom through another hydrocyclone. The overflow from the latter hydrocyclone was used as the admixture of comminuted oat fraction and hexane. The techniques used for obtaining such an admixture of comminuted oat fraction in hexane are described in greater detail in the aforementioned patent applications of R. W. Oughton.

The comminuted oat fraction of the admixture contained 87.5% protein. The admixture of such fraction and hexane contained 2.79% by weight solids. The hexane contained 2.4% by weight of oat oil.

Protein contents (nitrogen X 6.25) in this example, and in the examples that follow, were determined by macro Kjeldahl analysis.

Further experimental details and the results obtained were as follows:

| Run No. | Voltage Applied (kV) | Time (sec) | Electrode Spacing (mm) | Weight Deposited (g)* | Protein Content of Deposit (%) |
|---|---|---|---|---|---|
| 1 | 15 | 30 | 11.4 | 0.373 | 81 |
| 2 | 15 | 90 | 11.4 | 0.655 | 78 |
| 3 | 10 | 90 | 11.4 | 0.332 | 81 |
| 4 | 10 | 30 | 34.2 | 0.189 | 78 |
| 5 | 15 | 30 | 34.2 | 0.254 | 84 |
| 6 | 10 | 90 | 34.2 | 0.217 | 71 |
| 7 | 15 | 90 | 34.2 | 0.348 | 78 |
| 8 | 12.5 | 10 | 22.8 | 0.142 | 79 |
| 9 | 12.5 | 110 | 22.8 | 0.501 | 78 |
| 10 | 12.5 | 60 | 22.8 | 0.452 | 80 |
| 11 | 8.3 | 60 | 22.8 | 0.248 | 78 |

*The deposit was on the anode only. The cathode wasfree of deposit.

EXAMPLE II

In this example the anode was a rotating aluminum drum having a diameter of about 6.25 cm and a length of about 12 cm. The cathode was aluminum foil. The cathode was spaced apart from the anode by about 2 cm. The electrodes were located in a polyethylene container, the rotating drum being in a horizontal position. An admixture of comminuted oat fraction and hexane was added so as to cover approximately one third of the drum.

The comminuted oat fraction and hexane used in this example had been obtained in a manner similar to that of Example I. The admixture contained 8% by weight of solids, the solids having a protein content of 75% by weight.

The drum was rotated at approximately 0.7 rpm. A d.c. electric field of 15 kV (7.5 kV/cm) was applied across the electrodes. After 2 minutes the electric field was discontinued and the admixture was replaced with hexane. The drum was rotated a number of times so as to wash the deposit on the drum. The deposit remained adhered to the drum and when subsequently dried was very white in colour, being significantly whiter than deposited comminuted oat fraction that had not been washed with hexane.

This example, together with separation of the deposit from the rotating drum, for example by scraping, illustrates a method for the continuous separation of comminuted oat fraction from an admixture thereof with hexane.

EXAMPLE III

Using the techniques described in the aforementioned patent applications of R. W. Oughton two admixtures of comminuted oat fraction and hexane were prepared. One admixture contained comminuted oat fraction having a protein content of 73.3% by weight while the other admixture contained comminuted oat fraction having a protein content of 7.3% by weight. A series of admixtures samples were prepared by blending various amounts of the two admixtures, hexane being added as necessary so as to obtain samples having the same volume (450 ml) and the same weight of solids (28.5 g).

Each sample was placed in a cylindrical vessel containing a cylindrical wire mesh cathode against the inside wall thereof. The anode, which was centrally located in the vessel, was comprised of a rod having three cone-shaped discs attached thereto in spaced apart relationship. Each cone-shaped disc had a lip on its lower edge. The samples were agitated so as to be in the form of a slurry. A d.c. electric field of 15 kV (7.5 kV/cm) was applied for a period of one minute. The anode was then removed from the vessel and allowed to dry for 15 minutes. The deposit was then scraped off the anode and weighed.

Further experimental details and the results obtained were as follows:

| Run No. | Protein Content of Sample Solids | Current (mA) | Oat Fraction Deposited (%) | Protein Content of Deposits (%) |
| --- | --- | --- | --- | --- |
| 1 | 73 | 0.40 | 32.8 | 58 |
| 2 | 61 | 0.25 | 20.5 | 38 |
| 3 | 56 | 0.20 | 15.7 | 35 |
| 4 | 48 | 0.20 | 5.8 | 23 |
| 5 | 42 | 0.17 | 3.0 | 11 |
| 6 | 33 | 0.13 | 3.2 | 8 |
| 7 | 23 | 0.10 | 4.0 | 4 |
| 8 | 7 | 0.04 | 3.0 | 4 |

This example would appear to show that the amount deposited depends on the composition of the admixture and that the oat fraction deposited may have a lower protein content than that of the admixture.

EXAMPLE IV

In examples I–III the comminuted oat fraction had been derived from comminuted groats that had been sieved and then subjected to protein segregation techniques using hydrocyclone. In this example the comminuted oat fraction was a comminuted flour fraction obtained by comminuting groats, admixing with hexane and sieving a bran fraction away from the flour fraction.

When the resulting admixture of comminuted flour fraction and hexane was subjected to a high voltage d.c. electric field e.g. 15 kV (1.9 kV/cm), it was found that material was deposited on both electrodes and that, in contrast to the results of Examples I–III, the material did not remain on the electrodes, which were in a vertical position, when the high voltage electric field was not being applied.

To determine whether or not the material deposited on the two electrodes differed in composition, a sample of comminuted Hinoat groats that had been de-oiled using cyclohexane was admixed with cyclohexane in the form of a slurry in a WARING TM blender and placed in a vessel having foil electrodes. A d.c. electric field of 20 kV (2.5 kV/cm) was then applied until the cyclohexane miscella became clear. With the electric field still being applied the cyclohexane was frozen by placing the vessel in liquid nitrogen. Samples of the deposit on each electrode were then obtained and analyzed. The procedure was repeated in the absence of the de-oiling step, with different varieties of oats and/or on flour samples.

The results obtained were as follows:

| Sample | De-Oiled | Protein Content of Deposits (%) | |
| --- | --- | --- | --- |
| | | Anode | Cathode |
| Hinoat groats | nc | 14.8 | 18.9 |
| Hinoat groats | yes | 16.7 | 16.1 |
| Hinoat flour | no | 12.1 | 18.3 |
| Hinoat flour | yes | 12.2 | 15.0 |
| Stormont groats | no | 19.0 | 21.0 |
| Stormont groats | yes | 19.4 | 20.5 |
| Stormont flour | no | 12.4 | 25.6 |
| Stormont flour | yes | 13.1 | 17.1 |
| Scott groats | no | 13.3 | 16.8 |
| Scott groats | yes | 14.9 | 15.5 |
| Scott flour | no | 12.2 | 18.7 |
| Scott flour | yes | 9.2 | 15.5 |

A difference in the composition of the deposit at the two electrodes was generally obtained.

EXAMPLE V

The procedure of Example VI was repeated, in the absence of the de-oiling step, using 25 g of Hinoat groats, having a protein content of 20%, and 250 g of cyclohexane. After mixing in the WARING blender the resultant admixture was divided into three equal portions. The first sample of the admixture was subjected to the electric field (2.5 kV/cm) and frozen without further treatment. The second and third samples of the admixture were admixed with 1 g and 2 g, respectively, of oat oil before being subjected to the electric field and frozen. Samples from the anode and cathode were analyzed in each instance.

| Sample | Oat Oil Added (g) | Protein Content of Deposit (%) | |
| --- | --- | --- | --- |
| | | Anode | Cathode |
| 1 | 0 | 18.9 | 21.6 |
| 2 | 1 | 19.7 | 21.5 |
| 3 | 2 | 20.9 | 24.5 |

EXAMPLE VI

To determine effects of electrode configuration six foil electrodes measuring 7.5 cm by 25 cm were prepared from aluminum foil. A further six rod electrodes having a length of 15 cm were made from aluminum rod of a diameter of 1.2 cm. All electrodes were weighed.

A 400 ml PYREX TM beaker, measuring 7.2 cm in diameter and 11 cm in height, was charged with 300 ml of a hexane miscella containing fine solids, principally as a dispersion, and a magnetic stirrer. The miscella had been obtained from the discharge of a decanter centrifuge to which an admixture of a comminuted high protein-content oat fraction and hexane had been fed.

A foil electrode was placed inside the beaker and against the wall thereof. The miscella covered the foil electrode. A rod electrode was located vertically in the centre of the beaker. The submerged surface area of the rod electrode was about 25 cm$^2$.

Two sets of experiments were carried out. In the first set, the outer electrode was grounded and a d.c. electric field of 20 kV (6.7 kV/cm) was applied across the electrodes, the outer electrode being the anode. The electrodes were changed at the end of 120, 240, 360 and 1080 seconds total elapsed time for the application of the electric field.

In the second set of experiments the inner electrode was grounded and was the anode. The applied electric field was again 20 kV (6.7 kV/cm). A new 300 ml sample of hexane miscella was charged to the beaker.

The amount of deposit and the protein content of the deposit was determined in each case. The results were as follows:

| Elapsed Time (sec) | Collection Time (sec) | Current (mA) | Deposit (g) | Protein Content (%) |
|---|---|---|---|---|
| 1. Outer Electrode grounded: | | | | |
| 120 | 120 | 0.9 | 1.57 | 66 |
| 240 | 120 | 0.9 | 0.54 | 67 |
| 360 | 120 | 1.0 | 0.60 | 72 |
| 600 | 240 | 1.0 | 0.60 | 74 |
| 1080 | 480 | 1.0 | 0.25 | 76 |
| | | | 3.56 | |
| 2. Inner Electrode grounded: | | | | |
| 120 | 120 | 0.8–0.4 | 1.51 | 64 |
| 240 | 120 | 0.8–0.7 | 0.41 | 66 |
| 360 | 120 | 0.8–0.6 | 0.33 | 74 |
| 600 | 240 | 0.9–0.7 | 0.27 | 75 |
| 1080 | 480 | 0.9–1.0 | 0.22 | 76 |
| | | | 2.74 | |

In each experiment the deposit was on the anode i.e. the grounded electrode, which was the electrode of highest field intensity in the second set of experiments only.

EXAMPLE VII 100 g of groats, which had been comminuted using a roller mill were admixed with 300 g of hexane and sieved through a 80 mesh TYLER ™ screen. The undersized material i.e. that passing through the screen, was pumped through a glass cylinder equipped with a centrally located rod cathode and a cylindrical wire mesh anode at the circumference of the cylinder. A d.c. electric field of 15 kV (7.5 kV/cm) was applied across the electrodes. The hexane miscella passing through the cylinder was fed to the screen and recycled back through the cylinder.

The undersized material became deposited on the anode. The bran, which was retained on the screen, became very clean in appearance. The miscella became clear and free of visible particles in about one minute. After a period of time the hexane miscella was replaced with fresh hexane so as to wash the undersized material (flour) on the anode.

At the end of the run the hexane in the cylinder was drained off. The flour drained out of the cylinder with the hexane.

EXAMPLE VIII

A sample of dehulled oats was comminuted in a knife mill using a 1 mm screen. A 25 g sample of the comminuted groats was admixed with 250 g of FREON 113 fluorocarbon solvent (trichlorotrifluoroethane) in a 400 ml beaker fitted with two electrodes. The electrodes were a cylindrical aluminum foil cathode located against the inner wall of the beaker and a centrally located anode, of rolled aluminum foil, approximately 1 cm in diameter. A d.c. electric field of 20 kV (6.7 kV/cm) was applied across the electrodes.

The comminuted oats became deposited on the anode and remained on the anode when that electrode was withdrawn from the solution with the electric field still being applied.

This example illustrates that the process of the present invention is capable of being used with a liquid fluorocarbon as the solvent.

EXAMPLE IX

Apparatus for the continuous separation of comminuted oats from an admixture thereof with solvent was constructed as follows: A hollow steel chrome plated drum 15.2 cm in diameter and 19.1 cm in width was adapted to be rotated at speeds between 0 and 10 rpm. The drum was adapted to permit internal cooling or heating of the drum. The drum was located, with its axis horizontal, above a curved tray 18 cm in length. The tray was spaced apart from the drum by 1.2 cm throughout its length and was adapted to contain the admixture of oats and solvent. The tray was equipped with header systems to facilitate uniform distribution of admixture on one side, viz the inlet side, of the tray and uniform discharge of miscella from the tray on the other side, viz the outlet side. The tray had a capacity of approximately 500 ml. The sides of the tray were fabricated from an acrylic polymer.

The drum was adapted to rotate counter to the direction of flow of the admixture. Solids adhering to the drum during operation of the apparatus were dried using heated nitrogen gas prior to being removed using a pressure loaded TEFLON ™ scraper blade.

A d.c. electric field of up to 20 kV was applied across the drum and tray with the tray being cathode, the drum being anode and ground. The apparatus was enclosed and blanketed with nitrogen, the oxygen content of which was monitored.

In a run three liters of an admixture of an oat fraction, derived from comminuted oats using a series of hydrocylones, in hexane was fed to the tray by means of the inlet header. The admixture contained 5.9%, by weight, of solids analyzing 80.5 %, by weight, protein. The temperature of the drum was controlled at 60° C. while that of the nitrogen was 65° C. The flow rate of the heated nitrogen was 33 1/min. The drum was rotated at 3 rpm counter to the direction of flow of the admixture.

The admixture was fed, at a temperature of approximately 23° C., to the inlet header at a rate of 490 ml/min for a period of 5 minutes. An electric field of 20 kV (16.7 kV/cm) was applied between the drum and the tray. The average current was 0.7 mA. The electric field was applied, with the drum rotating, for 2 minutes after the flow of admixture to the header was stopped. The solids, collected from the drum, and the miscella were both analyzed. The results were as follows:

| Solids | | Miscella: | |
|---|---|---|---|
| Weight (g) | 113 | Volume (ml) | 2425 |
| Protein Content (%) | 77.6 | Temperature (°C.) | 43 |
| Residual hexane (%) | 0.12 | Solids content (%) | 0.20 |

This example illustrates a continuous method for the separation of an oat fraction of high protein content from an admixture thereof with solvent.

I claim:

1. A process for the separation of a comminuted oat fraction from an admixture thereof with an aliphatic hydrocarbon solvent containing from 5 to 8 carbon atoms or a normally liquid chlorofluorocarbon containing 1 or 2 carbon atoms, comprising the steps of:

(a) subjecting the admixture to the influence of a high voltage d.c. electric field, said admixture being in the form of a slurry and said electric field being formed between an anode and a cathode, and thereby depositing at least part of the comminuted oat fraction on at least the anode, and (b) separating the part so deposited from said admixture.

2. The process of claim 1 in which the high voltage electric field has an intensity in the range of about 1–20 kV/cm.

3. The process of claim 1 in which the comminuted oat fraction is deposited on both the anode and the cathode.

4. The process of claim 1 in which the cominuted oat fraction is only deposited on the anode.

5. The process of claim 2 in which the comminuted oat fraction is in the form of comminuted groats.

6. The process of claim 2 in which the comminuted oat fraction is in the form of a fraction derived from comminuted groats.

7. The process of claim 6 in which the comminuted oat fraction is a fraction of high protein content.

8. The process of claim 6 in which the comminuted oat fraction if in the form of a dispersion.

9. The process of claim 6 in which the solvent is substantially free of oat oil.

10. The process of claim 2 in which the solvent is selected from the group consisting of pentane, hexane, heptane, cyclohexane and chlorofluorocarbons, and mixtures thereof.

11. The process of claim 6 in which the solvent is selected from the group consisting of pentane, hexane, heptane and cyclohexane, and mixtures thereof.

12. The process of claim 6 in which the solvent is a chlorofluorocarbon.

13. The process of claim 6 in which the high voltage electric field has an intensity in the range of about 5–15 kV/cm.

14. The process of claim 4 in which the anode is a rotating drum.

15. The process of claim 4 in which step (b) is followed by a step (c) in which the fraction deposited on the anode is contacted with solvent essentially free of oil.

* * * * *